Oct. 12, 1926.

A. A. SEBASTIAŃ

1,602,555

ROLLER

Filed Jan. 6, 1923

Witness:
R. Burkhardt.

Inventor:
Alphonse A. Sebastian,
By Cromwell, Greist + Warden
Attys.

Patented Oct. 12, 1926.

1,602,555

UNITED STATES PATENT OFFICE.

ALPHONSE A. SEBASTIAN, OF CHICAGO, ILLINOIS, ASSIGNOR TO ANDREW HOFFMAN MFG. CO., OF CHICAGO, ILLINOIS, A CORPORATION OF ILLINOIS.

ROLLER.

Application filed January 6, 1923. Serial No. 611,195.

This invention relates generally to hardware devices known as rollers, and more particularly to that class of rollers used with a guideway and attached to sliding doors, casement windows or other similarly movable structures, which while serving as rollers also may act as hinges and as suspension or supporting devices.

The general purpose of this invention is the provision of a novel bearing construction whereby binding of the roller in its guideway is eliminated when the relative position of the guideway and the movable structure becomes abnormal.

The principal object of the invention is to provide a construction which will permit the roller to retain its normal position in the guideway, in spite of an abnormal position of the bearing engagement which is affixed to the movable object.

A further object of the invention is the provision of a construction which will still function when a permanent displacement of the parts to an out-of-line position takes place, said construction being adapted to accommodate itself to the new position by wearing new and perfect bearing surfaces of the type of the original.

Still other advantages to be derived from the use of this invention will be obvious to those skilled in the art, and while these may not be elaborated upon in the following specification and claims, they should be considered as adding to the merits of the invention.

Figure 1:
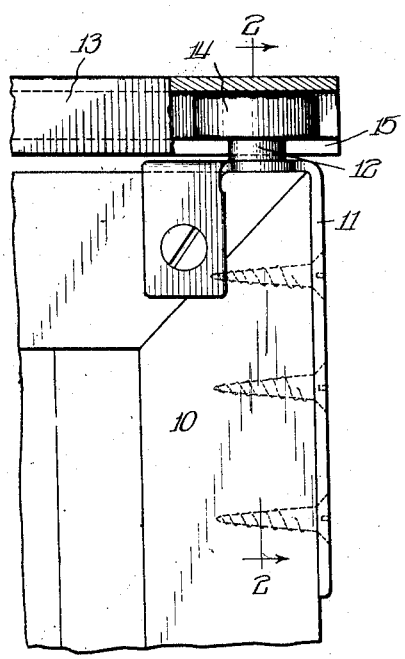
Fig. 1 shows the corner of a door equipped with the roller, in a horizontal groove, the groove being shown partly cut away, and the door being suspended from the roller.

Referring to the drawings in which like parts are similarly designated by common numerals, let it be understood that 10 is the door frame to which is attached the metal bracket piece 11 carrying the pivotal pin 12. The groove or track piece 13 carries the roller 14 resting on the underlying lips 15 of the groove or track, between which lips 15 is the slot 16 for the pin 12. The pin 12 is attached to the bracket 11 by suitably headed means as the head 17 which may be of rivet formation integral with the pin 12, or which may be the head of a screw engaging with the pin 12, or the head of a screw socket fitting within the pin and receiving a screw thru the top of the pin, said screw clamping the pin 12 tightly to the bracket piece 11; all of which construction is not shown in detail in the drawings.

Figure 2:
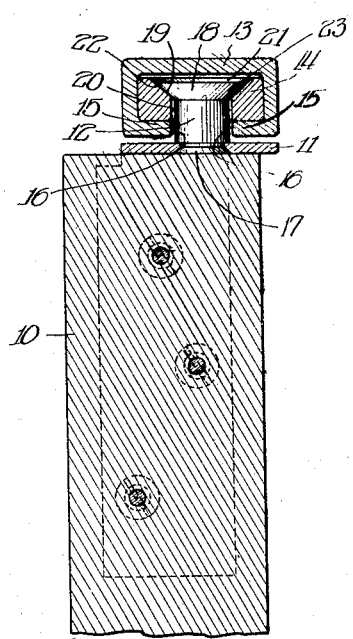
Fig. 2 is a sectional view along the line 2—2 of Fig. 1.

The pin 12 has at its upper portion a head 18 which may be conical, or otherwise shaped, so that the diameter of the head 18 is increasing towards the top of the head. The pin 12 has preferably a uniform diameter the same as the smallest diameter of the head 18, and less than the width of the slot 16, and also less than the central bore of the roller 14. The roller 14 has its upper face countersunk central with its bore, forming a surface 19 corresponding to the curvature of the pin-head 18. When the roller and the pin-head 18 are centrally in line with each other and have their correspondingly curved or conical faces engaging as in Fig. 2, there is an annular lateral clearance space 20 between the pin 12 and the roller 14. In this position the countersunk face of the roller 14 is above the face of the pin-head 18 and is parallel to it, leaving the clearance space 21.

Figure 3:
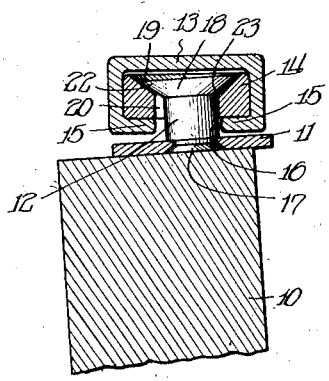
Fig. 3 is the same as Fig. 2 showing an exaggerated abnormal relation of the door and roller groove.

Referring to Fig. 3, an exaggerated displaced position of the door and track is shown. It is obvious that the clearance spaces 20 and 21 are here utilized to advantage to accommodate this displacement without effecting a strain between the moving parts. The pin 12 with the pin-head 18 assumes the out-of-line position but the roller 14 remains in its normal position in the groove or track 13. In the conical head 18 shown, the tip 22 bears upon the roller surface 19 on one side, and the portion 23 of the head 18 bears upon the surface 19 at the opposite side. In this position the pressure upon the roller is still downwards as in the normal position, and the roller does not cant or bind. In the ordinary roller with an interlocking and snugly fitting pin-bearing the roller would bind in the groove or track and the pin would bind in the bearing. When the abnormal position shown in Fig. 3 becomes permanent from warping of the parts or other causes, the cone or other surfaces will accommodate themselves to each other by wearing into a more perfect engagement, thus presenting a surface differing slightly from the original but of the same general character as herein described.

Figure 4:
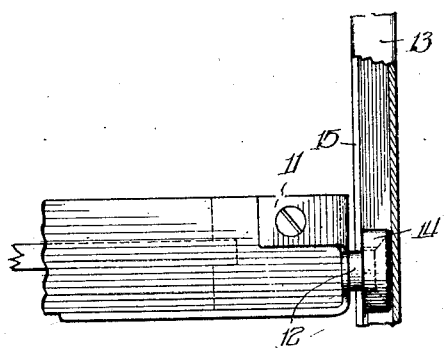
Fig. 4 shows the use of the roller in a vertical groove or track, the latter being partly cut away.

In the above described embodiment of this invention the roller and pin are shown as the suspension means for the door or similar structure, the weight of the latter serving to keep the bearing surfaces in contact. However, it is not essential that such be the case, for the same benefits will be derived from any other use of the improved roller. In Fig. 4 there is shown such another use of the same embodiment, where the path of the roller 14 in its groove or track 13 is in a vertical direction. It is perfectly obvious that the invention may be utilized in any direction where it is desirable to have a roller travelling in a guide such as a groove or track.

Because the above preferred embodiment of this invention has been used for illustrative purposes only, it is not to be construed that the invention is limited to this form nor that this embodiment in any other way limits the invention short of its broad and comprehensive scope, as clearly pointed out in the appended claims.

I claim:

1. In a device of the character described, a roller guideway, a roller therein, and a pin on which the roller is journalled, said roller having a central bore which fits loosely about the pin and has a portion which is of increasing diameter as it approaches one face of the roller, and said pin having a portion which is also of increasing diameter as it approaches that face of the roller, whereby to provide opposed bearing surfaces on the roller and pin between which free relative rotation may be had even when the roller and the pin are not in axial alignment with each other.

2. In a device of the character described, a roller guideway, a roller therein, and a pin on which the roller is journalled, said roller having a central bore which fits loosely about the pin and has a conical portion diverging into one face of the roller, and said pin having a conical portion for coaction with the conical portion of the bore in the roller, whereby to provide opposed surfaces on the roller and pin between which free relative rotation may be had even when the roller and the pin are not in axial alignment with each other.

3. In a device of the character described, a roller guideway of rectangular cross-section having a slot in one wall thereof, a roller of such proportions relative to the guideway as to be capable only of longitudinal movement therein, and a journalling pin for the roller extending into the guideway through the slot, said roller having a central bore which fits loosely about the pin and is of increasing diameter as it approaches the face of the roller nearest the back of the guideway, and said pin having an end portion which terminates short of that face of the roller and is also of increasing diameter as it approaches that face, whereby to permit relative tilting between the pin and the roller and guideway without causing the end of the pin to project beyond the adjacent face of the roller.

In testimony whereof I have hereunto subscribed my name.

ALPHONSE A. SEBASTIAN.